E. BURCH.
FENDER.
APPLICATION FILED DEC. 23, 1919.
1,336,277.
Patented Apr. 6, 1920.
Fig. 1.
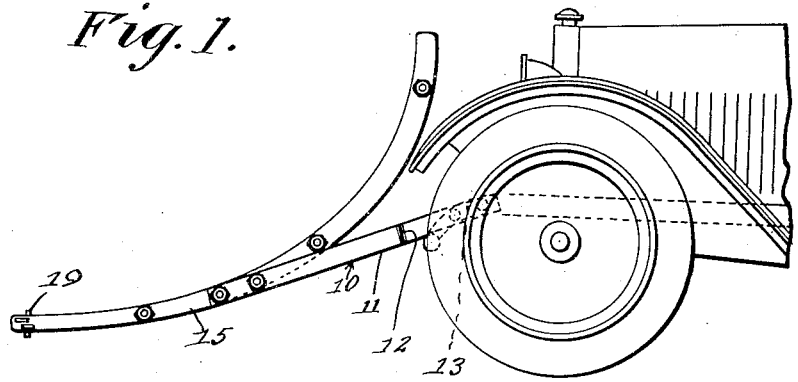
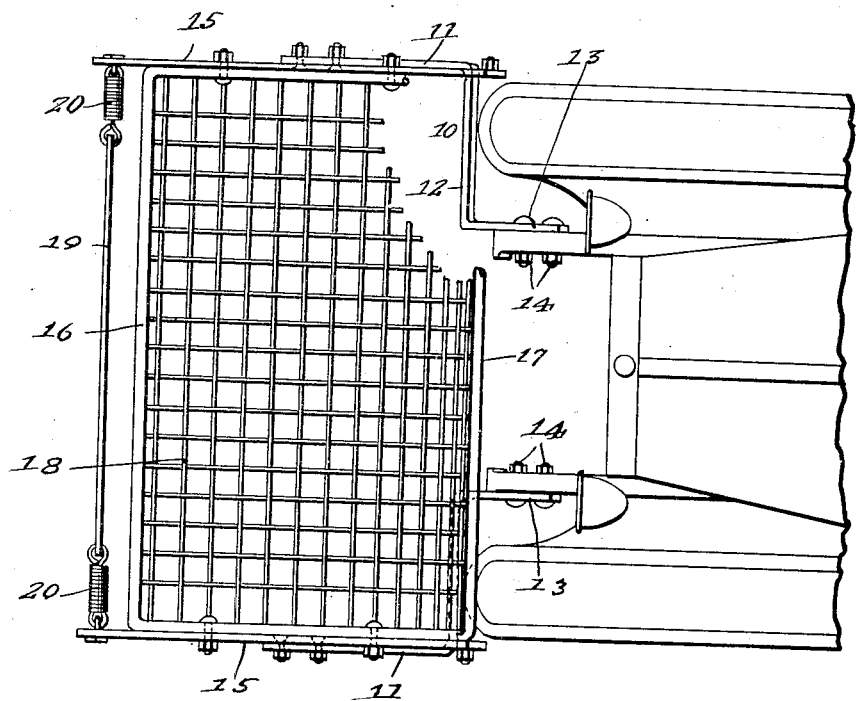
Fig. 2.
Witnesses
Inventor
Edwin Burch
By Victor J. Evans
Attorney

UNITED STATES PATENT OFFICE.

EDWIN BURCH, OF BALTIMORE, MARYLAND.

FENDER.

1,336,277.     Specification of Letters Patent.     Patented Apr. 6, 1920.

Application filed December 23, 1919. Serial No. 346,867.

*To all whom it may concern:*

Be it known that I, EDWIN BURCH, a citizen of the United States, residing at Baltimore, Maryland, have invented new and useful Improvements in Fenders, of which the following is a specification.

This invention relates to improvements in fenders for vehicles and is especially designed for use upon automobiles.

An object of the invention is the provision of a fender, which is located in advance of the vehicle and spaced upon the roadway for the purpose of catching a person or object and preventing them from coming in contact with the vehicle.

Another object is the provision of yielding means located in advance of the fender, which will contact with a person at a point approximately above the ankle and acts to trip and catch the person upon the fender, the yielding contact absorbing the shock so as to reduce danger of injury.

Other objects and advantages of the invention will appear as the following description is read in connection with the accompanying drawings.

In the drawings:—

Figure 1 is a side elevation showing the front portion of a motor vehicle with the invention applied thereto.

Fig. 2 is a top plan view of the same.

Referring to the drawings in detail, wherein like characters of reference denote corresponding parts, the fender is shown as comprising side arms 10, which comprise substantially parallel portions 11, inwardly extending portions 12 and substantially parallel portions 13, the latter being bolted or otherwise secured to the frame of the vehicle as indicated at 14, or in any other well known or preferred manner.

The forward end of the side arms 10 have secured thereto side bars 15 the latter forming the sides of the frame, the end members of which comprise front and rear connecting bars 16 and 17. Secured within this frame is a preferably metallic net 18 which is formed of resilient woven strands and as the side bars 15 extend substantially horizontal for a portion of their length and rearwardly and upwardly, there is provided a curved neck, whose width is co-extensive with the width of the vehicle and which extends upwardly in front of the vehicle. The front connecting bar 16 is spaced from the extremities of the side bars 16 and these extremities are connected by a flexible member in the form of a strap 19, the ends of which are connected to the extremities of the side bars by means of coiled springs 20.

The forward end of the fender is spaced about six inches above the roadway, so that the forward flexible connection will contact with the limbs of a person at a point directly above the ankle. This will result in tripping the person and throwing him upon the net 18, the yieldable character of the contact reducing the danger of injury and as the net 18 is also of a yieldable character, the liability of injury is further reduced. By the use of the fender as herein shown and described, contact with a vehicle and liability of falling beneath the wheels is prevented.

The invention is susceptible of various changes in its parts, proportion and minor details of construction and the right is herein reserved to make such changes as properly fall within the scope of the appended claims.

Having described the invention what is claimed is:—

1. The combination with a vehicle, of a fender comprising forwardly extending side arms adapted to be secured to the vehicle, a frame secured to said side arms, said frame including curved side bars formed to provide forwardly extending substantially horizontal portions and rearwardly and upwardly extending portions, front and rear bars connecting the side bars, said front bar being spaced from the forward ends of the side bars, a net secured within said frame and a yieldable member connecting the forward extremities of the side bars and spaced in advance of the front connecting bar.

2. The combination with a vehicle, of a fender comprising forwardly extending arms adapted to be secured to the vehicle, a frame secured to said side arms, said frame including curved side bars formed to provide forwardly extending substantially horizontal portions and rearwardly and upwardly extending portions, front and rear bars connecting the side bars, said front bar being spaced from the forward ends of the side bars, a net secured within said frame and a yieldable member connecting the forward extremities of the side bars and spaced in advance of the front connecting bar, said yieldable member comprising a flexible strip having each of its ends connected to the forward extremities of the side bars by coiled springs.

In testimony whereof I affix my signature.

EDWIN BURCH.